United States Patent
Bender et al.

(10) Patent No.: US 9,324,292 B2
(45) Date of Patent: Apr. 26, 2016

(54) SELECTING AN INTERACTION SCENARIO BASED ON AN OBJECT

(71) Applicant: Hewlett-Packard Development Company, L.P., Houston, TX (US)

(72) Inventors: Roberto Bender, Porto Alegre (BR); Diogo Strube de Lima, Porto Alegre (BR); Otavio Correa Cordeiro, Porto Alegre (BR); Rodrigo Menezes do Prado, Porto Alegre (BR); Soma Sundaram Santhiveeran, Freemont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 156 days.

(21) Appl. No.: 13/629,508

(22) Filed: Sep. 27, 2012

(65) Prior Publication Data

US 2014/0085180 A1 Mar. 27, 2014

(51) Int. Cl.
*G06K 9/00* (2006.01)
*G09G 5/00* (2006.01)
*G06F 3/147* (2006.01)
*G06F 3/038* (2013.01)

(52) U.S. Cl.
CPC *G09G 5/00* (2013.01); *G06F 3/038* (2013.01); *G06F 3/147* (2013.01); *G09G 2320/0261* (2013.01); *G09G 2354/00* (2013.01)

(58) Field of Classification Search
CPC .. G06Q 30/0215; G06Q 20/12; G06F 3/0481; G06F 21/31
USPC ........... 382/118, 124; 358/1.18; 345/156, 633
See application file for complete search history.

(56) References Cited

U.S. PATENT DOCUMENTS

| | | | |
|---|---|---|---|
| 6,184,926 B1* | 2/2001 | Khosravi et al. | 348/239 |
| 6,694,058 B1* | 2/2004 | Burchart | G06F 3/017 |
| | | | 382/115 |
| 7,283,650 B1* | 10/2007 | Sharma et al. | 382/118 |
| 7,889,381 B2* | 2/2011 | Suzuki et al. | 358/1.18 |
| 7,930,204 B1 | 4/2011 | Sharma et al. | |
| 8,010,402 B1 | 8/2011 | Sharma et al. | |
| 8,254,684 B2* | 8/2012 | Raju | 382/181 |
| 8,313,380 B2* | 11/2012 | Zalewski et al. | 463/39 |
| 8,660,303 B2* | 2/2014 | Izadi et al. | 382/103 |
| 2004/0046736 A1* | 3/2004 | Pryor et al. | 345/156 |
| 2009/0274339 A9* | 11/2009 | Cohen et al. | 382/103 |
| 2011/0246291 A1 | 10/2011 | Paul | |
| 2013/0124186 A1* | 5/2013 | Donabedian et al. | 704/2 |

OTHER PUBLICATIONS

"Shelfx"; http://www.shelfx.com/our-shelfx-system; 2 pages.

(Continued)

*Primary Examiner* — Calvin C Ma
(74) *Attorney, Agent, or Firm* — HP Patent Department

(57) ABSTRACT

Techniques for selecting an interaction scenario based on an object are described in various implementations. A method that implements the techniques may include receiving, at a computer system and from an image capture device, an image that depicts a viewing area proximate to a presentation device. The method may also include processing the image, using the computer system, to detect a user in the viewing area presenting an object in a manner that indicates desired interaction with the presentation device. The method may also include selecting, using the computer system, an interaction scenario for presentation on the presentation device based on the object.

20 Claims, 3 Drawing Sheets

(56) References Cited

OTHER PUBLICATIONS

"The ShelfX Advantage", http://www.shelfx.com/the-shelfx-advantage; 1 page.

Prigg, M.; "The Facebook Camera That Can Recognise You Every Time You Walk Into a Shop"; Aug. 13, 2012; 11 pages.

* cited by examiner

SELECTING AN INTERACTION SCENARIO BASED ON AN OBJECT

BACKGROUND

In today's world, many products are sold through one of two primary channels—physical storefronts and online web stores. These two channels may provide very different shopping experiences for customers. For example, physical storefronts may typically allow customers the ability to physically interact with the products (e.g., to see, touch, hear, taste, and/or smell the products in person) and to speak in-person with sales representatives before committing to a purchase, but may not provide customers with the types of interactive and/or dynamic shopping experiences that are sometimes available online. Online web stores, on the other hand, may not allow customers the ability to physically interact with the products being offered for sale, and may provide less customer support than some retail storefronts, but the web stores may offer tailored shopping experiences for the customer (e.g., based on the customer's profile and/or tracking of the customer's online behavior), and may provide customers with access to a wide variety of content associated with the products they are viewing online.

Based on the differences between these shopping experiences, some customers may prefer one method of shopping over the other, or may even shop for a product using both channels. For example, a customer may initially shop for a product at a physical storefront, e.g., by going to the store to touch and see the item in person, before going online to gather more information about the product and ultimately complete the purchase. Such customer behavior may be detrimental to physical storefronts, especially in cases where the customer eventually purchases the product from a web store that is not associated with the physical storefront where the customer first shopped for the product.

DETAILED DESCRIPTION

Figure 1:
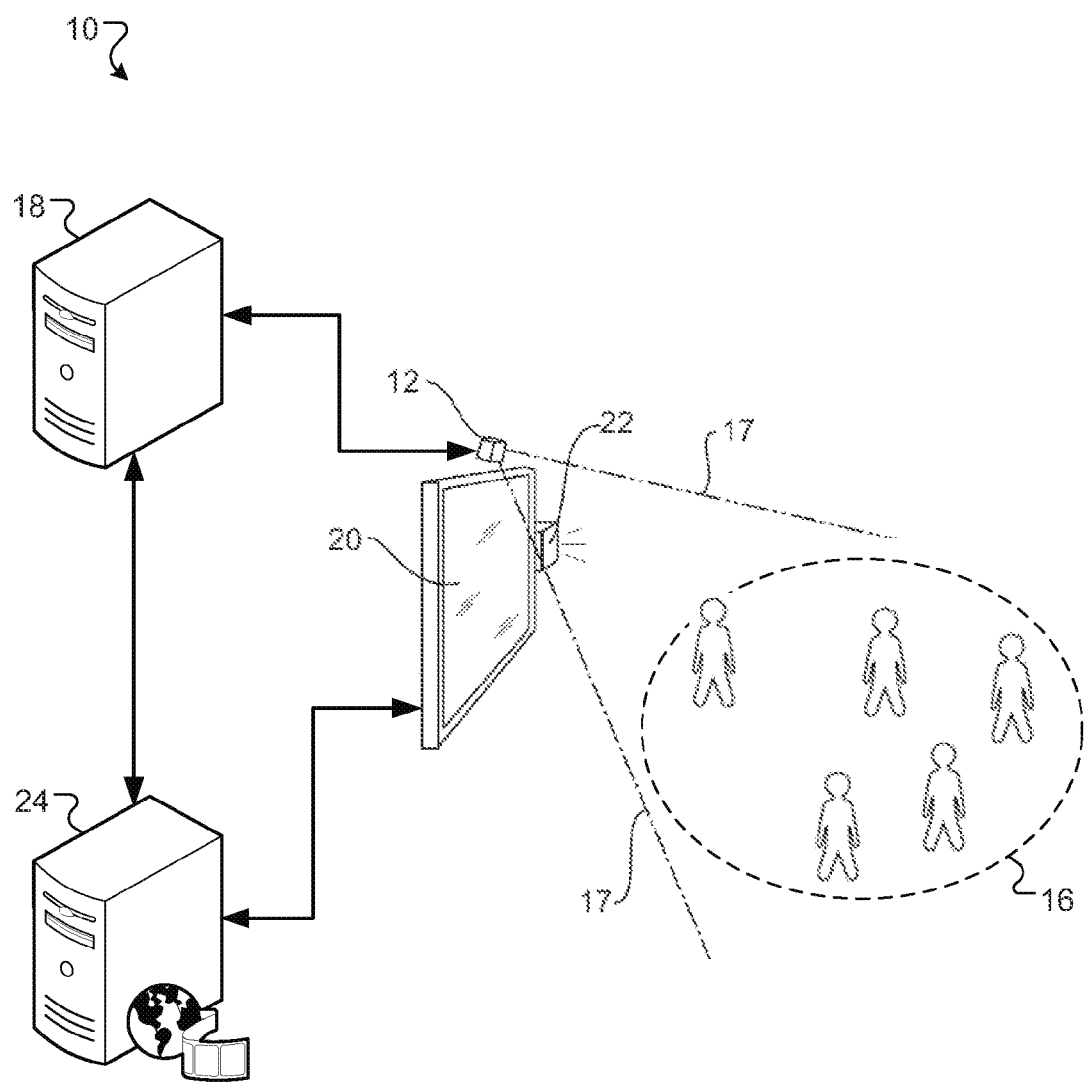
FIG. 1 is a conceptual diagram of an example presentation system in accordance with implementations described herein.

Online web stores typically gather vast amounts of information about a customer's online behaviors, including for example, what products the customer has viewed and when, what products the user has purchased and when, what products the user has purchased as gifts for others and when, who the user's social connections are and what their purchasing behaviors are, and so on. Such behavioral information may be collected specifically in association with individual users (e.g., on an opt-in basis, with the customer's understanding that allowing such information to be collected will lead to a more personalized shopping experience) and/or more generally in association with an aggregate population of users (e.g., anonymously with respect to individual users). In either case, the collection and analysis of such behavioral information may allow online web stores to learn what types of information and/or interactions lead to purchases by their customers, and may therefore provide the online web stores with a competitive advantage over traditional physical storefronts that are unable to capture such information.

In an example implementation of the techniques described here, a presentation system such as a digital signage installation at a retail storefront location may be used to collect customer shopping information on an opt-in basis, and/or to provide customers with a more tailored avid/or interactive shopping experience, which may be similar to the shopping experiences they are accustomed to having online. As an example, a customer who wishes to opt-in to such a system may simply present his or her customer loyalty card (or other similar form of user identification) to the digital signage system to "check-in" at the location. The act of checking in at a particular location of a store (e.g., a shoe section), may inform the system that the user is shopping for a particular type of product (e.g., shoes) at that particular date and time. In response to checking in, the customer may be rewarded with a discount, such as a coupon applicable to items purchased from the shoe section within a particular period of time. The user may further show his or her interest in a particular product (e.g., a specific shoe model) by showing the product to the presentation system. The act of showing interest in learning more about the particular product may provide the store with additional information about the user's interests and overall shopping patterns, especially when combined with past and future purchases by the user. In response to presenting the particular shoe to the system, the presentation system may provide the user with product information including, e.g., product videos, user reviews, other similar products, other complementary products, coupons or other discounts that are available for the product, or the like. The presentation system may also offer reduced pricing on one or more product bundles. The product bundles may be determined based on the customer's observed shopping behaviors (e.g., based on the customer's current interest in the specific shoe, or based on other products that the user has viewed or purchased in the past, or based on other products that the user is likely to want to view or purchase in the future).

A method that implements the techniques described here may include receiving, at a computer system and from an image capture device, an image that depicts a viewing area proximate to a presentation device. The method may also include processing the image, using the computer system, to detect a user in the viewing area presenting an object in a manner that indicates desired interaction with the presentation device. The method may also include selecting, using the computer system, an interaction scenario for presentation on the presentation device based on the object. In one example of the method, the presented object may include a user identifier (e.g., printed on a customer loyalty card), the interaction scenario may include a user sign-in procedure. In another example of the method, the presented object may include a product (e.g., a specific shoe model), and the interaction scenario may include presenting information associated with the product to the user.

In some implementations, the techniques described here may allow retail storefronts to gather user-specific and/or aggregated behavioral shopping information about customers who have opted-in to such information gathering, and may perform such information gathering in a manner that does not violate customers' rights to privacy. In some cases, the techniques may also allow retail storefronts to provide customers with improved shopping experiences. In some cases, the techniques may be performed using the equipment included in existing digital signage installations, such that deployment costs for implementing the techniques at such existing installations may be relatively minimal. These and other possible benefits and advantages will be apparent from the figures and from the description that follows.

FIG. 1 is a conceptual diagram of a presentation system 10 in accordance with implementations described herein. The presentation system 10 may be representative of a digital signage installation, e.g., at a retail store or other appropriate location. The example presentation system 10 includes at least one imaging device 12 (e.g., a camera) pointed at a viewing area, indicated here by dotted line 16. The viewing area may be proximate to a display device 20 of the presentation system, e.g., in an area in front of the display device, and may represent at least a portion of the field of view of the imaging device 12. Presentation system 10 also includes a content computer 18 and a presentation computer 24, either or both of which may be communicatively coupled to the imaging device 12.

The content computer 18 may include image analysis functionality, and may be configured to analyze visual images captured by the imaging device 12. The content computer 18 may generally be configured to identify content, including interaction scenarios, to be presented to users of the presentation system 10 based on the analysis of the captured images. The presentation computer 24 may generally be configured to control the presentation of such content. In some implementations, the functionality of content computer 18 and presentation computer 24 may be integrated into a single computing device.

The term "computer" as used here should be considered broadly as referring to a personal computer, a portable computer, an embedded computer, a server, or any other appropriate computing device that is capable of performing all or portions of the functionality described here. For example, in some implementations, certain functionality associated with an interactive presentation system may be performed using a tablet or another appropriate type of mobile computing device. The computers described herein can be any appropriate type of computing device, such as a device that includes a processing unit, a system memory, and a system bus that couples the processing unit to the various components of the computing device. The processing unit may include one or more processors, which may be in the form of any one of various commercially available processors. Generally, the processors may receive instructions and data from a read-only memory and/or a random access memory. The computing device may also include a hard drive, a floppy drive, and/or an optical drive (e.g., CD-ROM, DVD-ROM, or the like), which may be connected to the system bus by respective interfaces. The hard drive, floppy drive, and/or optical drive may access respective non-transitory computer-readable media that provide non-volatile or persistent storage for data, data structures, and computer-executable instructions to perform portions of the functionality described here. Other computer-readable storage devices (e.g., magnetic tape drives, flash memory devices, digital versatile disks, or the like) may also be used with the computing devices described herein.

Imaging device 12 may be configured to capture video images (i.e. a series of sequential video frames) at a desired frame rate, or to take still images, or both. The imaging device 12 may be a still camera, a video camera, or other appropriate type of device that is capable of capturing images at an appropriate resolution. One example of a relatively inexpensive imaging device 12 is a webcam.

Imaging device 12 may be positioned near a changeable display device 20, such as a CRT, LCD screen, plasma display, LED display, display wall, projection display (front or rear projection), or any other appropriate type of display device. For example, in a digital signage application, the display device 20 can be a small or large size public display, and can be a single display, or multiple individual displays that are combined together to provide a single composite image in a tiled display. The display may also include one or more projected images that can be tiled together, combined, or superimposed in various ways to create a display. In some implementations, imaging device 12 may be integrated with display device 20 (e.g., in a tablet or other integrated computing device). An audio output device, such as an audio speaker 22, may also be positioned near the display device 20, or integrated with the display device, to broadcast audio content along with the visual content provided on the display.

The imaging device 12 may be oriented toward an audience of one or more individual people, who are present in a viewing area, designated by dotted line 16. While the viewing area is shown as having a definite outline with a particular shape, the dotted line 16 is intended to represent that there is some appropriate area in which an audience can be viewed. The viewing area can be of a variety of shapes, and can comprise the entirety of the field of view 17 of the imaging device, or some portion of the field of view. For example, some objects can be located near the viewing area and perhaps even within the field of view of the imaging device, and yet not be within the viewing area that will be analyzed by content computer 18.

The presentation computer 24 may be communicatively coupled to the display device 20 and/or the audio speaker 22 to control the desired video and/or audio for presentation. The content computer 18 may be communicatively coupled to the presentation computer 24, which may allow feedback and analysis from the content computer 18 to be used by the presentation computer 24. The content computer 18 and/or the presentation computer 24 may also provide feedback to a video camera controller (not shown) that may issue appropriate commands to the imaging device 12 for changing the focus, zoom, field of view, and/or physical orientation of the device (e.g. pan, tilt, roll), if the mechanisms to do so are implemented in the imaging device 12.

In some implementations, a single computer may be used to control both the imaging device 12 and the display device 20. For example, the single computer may be configured to handle the functions of image analysis, content selection, and control of the imaging device, as well as controlling output to the display. In other implementations, the functionality described here may be implemented by different or additional components, or the components may be connected in a different manner than is shown.

In operation, the imaging device 12 captures an image of the viewing area, which may involve capturing a single snapshot or a series of frames (e.g., in a video). Imaging device 12 may capture a view of the entire field of view, or a portion of the field of view (e.g. a physical region, black/white vs. color, etc.). Additionally, it should be understood that additional imaging devices (not shown) can also be used, e.g., simultaneously, to capture images for processing. The image (or images) of the viewing area may than be provided to the content computer 18 for processing.

Content computer 18 may receive the image or images (e.g., of the viewing area from imaging device 12 and/or one or more other views), and may process the image(s) to detect a user in the viewing area who is presenting an object in a manner that indicates desired interaction with the presentation system 10. For example, the user may hold a particular product in front of the imaging device 12 for a short period of time to indicate that the user wants more information about the particular product. As another example, the user may present a user identification card or badge in front of the imaging device 12 to indicate that the user wishes to sign in to a customer system. According to the techniques described here, a user who does not act in a manner that indicates an opt-in decision to interact with the system or otherwise indicate desired interaction with the system will not trigger interaction with the system, even if the user is holding a recognizable object. For example, a user who is simply passing by the presentation system 10 with a recognizable object in his or her hand will not trigger an interaction. In some implementations, the content computer 18 may use appropriate facial and/or object detection methodologies to identify users captured in the image, and to further determine whether any of the identified users is presenting an object for inspection by the system in a manner that indicates desired interaction with the system, e.g., based on the user's pose (such as a hand holding the object raised towards the imaging device 12) and/or positioning of the object.

If such a user is detected, content computer 18 may attempt to recognize the object being presented by the user. In some implementations, the object may be marked with a visual tag that is recognizable by the system. For example, the visual tag may be printed on, embedded in, or otherwise attached to the object. In some implementations, the content computer 18 may extract, from the captured image, visual features associated with the object being presented, and may compare the extracted visual features to the visual features of objects that are known or recognized in the system. If the extracted visual features are determined to "match" the visual features of a known object, then the object being presented may be recognized as the known object. The matching of visual features may use any of a number of suitable techniques (e.g., signature matching, point matching, line matching, blob matching, or the like), or an appropriate combination of techniques, and may be configurable for a given implementation. The term "match" as used here should be considered broadly to include not only identical matches (e.g., all of the extracted visual features are identical to all of the visual features of the known object), but also near matches where at least a portion of the visual features are determined to be the same. The portion or amount of overlap of the features required for a match or near match to be declared may be configurable for a given implementation.

If the object is not recognized by the system, content computer 18 may generate a notification indicating that the object being presented is not a known object, and the notification may be displayed on display device 20.

If the object is recognized by the system, content computer 18 may select an interaction scenario for presentation on the presentation device based on the recognized object. In some implementations, each known object may be associated with a particular interaction scenario, e.g., in a one to one configuration. For example, the known object may be a specific product, and the particular interaction scenario may be to present product information associated with the specific product. In some implementations, multiple known objects may be associated with a more generalized interaction scenario, e.g., in a many to one configuration. For example, the known object may be any of a number of known products associated with a product group, and the more generalized interaction scenario may be to present information associated with the product group. After selecting an interaction scenario based, content computer 18 may cause the selected interaction scenario to be presented on the display device 20, e.g., via presentation computer 24.

One example use of presentation system 10 may be to provide user sign-in functionality. In such cases, a user may present an object that includes or otherwise represents a user identifier, such as a customer loyalty card with a customer number, a security badge with an employee number, or another type of object that uniquely identifies the user. In response to recognizing the object, the presentation system 10 may provide an interaction scenario that allows the user to sign in to a system. In some sign-in procedures, the interaction scenario may simply inform the user that he or she has been recognized and has been signed in. The interaction scenario may also provide content to the user based on signing in, such as displaying information about the user's account (e.g., the user's current status level or other account properties), information about discounts or other awards that are available for signing in, or the like. Such sign-in procedures may be used to identify where a user who wishes to be tracked is at a certain time, and may be used for any number of purposes such as customer tracking, employee tracking, or the like.

In some sign-in procedures, some form of additional validation may be required before the user is signed-in to the system. For example, the system may be configured to display a keypad that allows the user to enter a personal identification number (PIN) that matches the user's stored PIN before signing the user in to the system. As another example, the additional validation may require visual validation of the user. In such cases, the visual validation of the user may include facial recognition of the user based on the image of the user presenting the sign-in object. As yet another example, the system may utilize near-field communication (NFC) from the user's mobile device, or another form of secondary identification, as validation of the user's identity. These or other forms of validation may provide increased security associated with the sign-in procedures.

Another example use of presentation system 10 may be to provide product information associated with a particular product, e.g., in a retail store implementation. In such cases, a user may present to the presentation system 10 an actual product that is available in the store, a brochure that depicts the product, or any other object that represents or is associated with the product that the user wishes to learn more about. In response to recognizing the object (e.g., the product itself, or a picture of the product), the presentation system 10 may provide an interaction scenario that shows product information associated with the particular product.

The product information presented as part of the interaction scenario may include any number and/or types of content items associated with the product, including, e.g., product videos, user reviews, other similar products (e.g., other brands or available generics), other complementary products (e.g., other products that are often used with the product or that are often bought by customers who also bought the product), coupons or other discounts that are available for the product, or the like. The product information presented as part of the interaction scenario may also or alternatively include dynamic pricing models associated with the product, such as reduced bundle pricing for multiple products purchased together in a single transaction. For example, when a user presents a first product (e.g., toothpaste) to the system, the system may provide more information about the toothpaste, and may also inform the user that if the toothpaste is purchased with a second product (e.g., mouthwash), a discount will be applied to the transaction. The interaction scenario may also show the user where the mouthwash may be found in the store, e.g., by displaying a map from the user's current location to the location of the mouthwash.

Another example use of presentation system 10 may be to provide directions from the current location to another location that is associated with the object being presented (rather than to a complementary item as described above). In response to recognizing the object (e.g., an airline boarding pass, or a brochure advertising the product), the presentation system 10 may provide an interaction scenario that shows a map or directions to the location associated with the object (e.g., the departure gate for the flight, or the location of the product in the store).

It should be understood that the example uses described above are for illustrative purposes only, and that other uses or combinations of such uses are within the scope of this disclosure. For example, while the interaction scenarios described above primarily include displaying dynamic content to a user, the scenarios may also allow feedback from the user, e.g., in the form of spoken input captured by a microphone, touch screen input captured by the display device, or other appropriate feedback. Furthermore, the specific uses of the presentation system in a particular implementation may be configurable such that any visually recognizable object may be associated with any appropriate interaction scenario in accordance with the techniques described here.

In some implementations, the presentation system 10 may include a training mode that allows previously unknown objects to be trained (e.g., by an administrator) to be recognized by the system. Such training may include presenting any unknown object to the system in a manner similar to how a user presents a known object to the system, e.g., by holding the unknown object in view of the imaging device 12. In the training mode, the system may capture visual features associated with the unknown object, and may provide an interface for the administrator to associate the previously unknown object with a corresponding interaction scenario that is to be presented when the object is later presented to the system by a user. In some implementations, the system may provide an interface that allows the administrator to provide or update the visual features of an object directly, e.g., by uploading one or more images associated with the object to the system.

Figure 2:
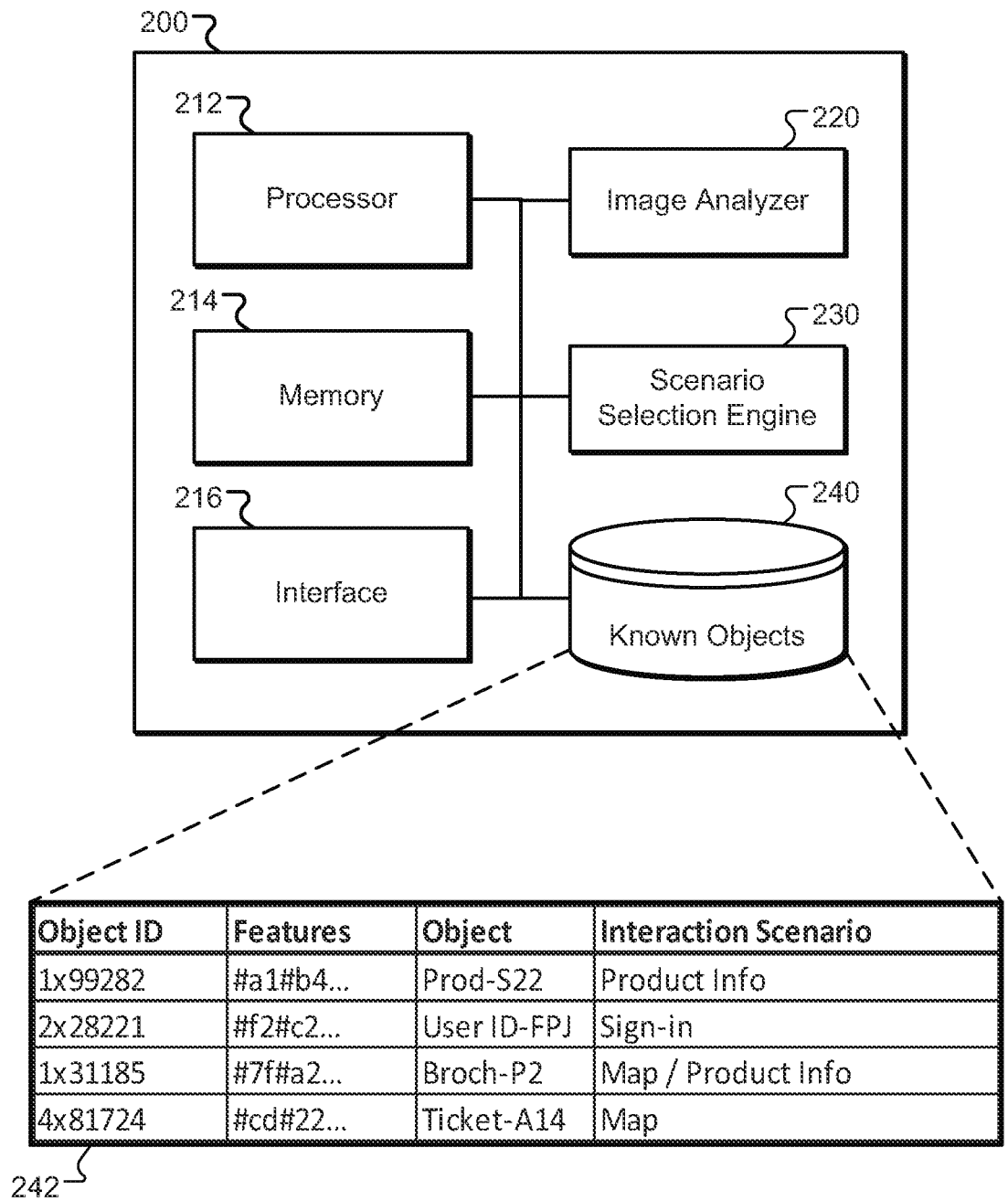
FIG. 2 is a block diagram of an example computing system for selecting an interaction scenario in accordance with implementations described herein.

FIG. 2 is a block diagram of an example computing system 200 for selecting an interaction scenario in accordance with implementations described herein. Computing system 200 may, in some implementations, be used to perform portions or all of the functionality described above with respect to content computer 18 of FIG. 1. As shown, the computing system 200 includes a processor 212, a memory 214, an interface 216, an image analyzer 220, a scenario selection engine 230, and a repository 240 of known objects. It should be understood that these components are shown for illustrative purposes only, and that in some cases, the functionality being described with respect to a particular component may be performed by one or more different or additional components. Similarly, it should be understood that portions or all of the functionality may be combined into fewer components than are shown.

Processor 212 may be configured to process instructions for execution by the system 200. The instructions may be stored on a non-transitory tangible computer-readable storage medium, such as in main memory 214, on a separate storage device (not shown), or on any other type of volatile or non-volatile memory that stores instructions to cause a programmable processor to perform the functionality described herein. Alternatively or additionally, system 200 may include dedicated hardware, such as one or more integrated circuits, Application Specific Integrated Circuits (ASICs), Application Specific Special Processors (ASSPs), Field Programmable Gate Arrays (FPGAs), or any combination of the foregoing examples of dedicated hardware, for performing the functionality described herein. In some implementations, multiple processors may be used, as appropriate, along with multiple memories and/or different or similar types of memory.

Interface 216 may be implemented in hardware and/or software, and may be configured to issue and/or receive various signals or commands associated with system 200. For example, interface 216 may be configured to receive, from an image capture device, images of a viewing area proximate to a display device. Interface 216 may also be configured to issue commands that cause the display device to present a particular presentation scenario. Interface 216 may also provide a user interface for interaction with a user, such as a system administrator. For example, the user interface may provide various control mechanisms to allow a system administrator to configure the various interaction scenarios or to train the presentation system with new objects.

Image analyzer 220 may execute on processor 212, and may be configured to process one or more images received from an image capture device. As used here, an image is understood to include a snapshot, a frame or series of frames (e.g., one or more video frames), a video stream, or other appropriate type of image or set of images. In some implementations, multiple image capture devices may be used to provide multiple images to computing system 200 for analysis. For example, multiple cameras may be used to provide images that capture different angles of a specific location (e.g., multiple views of a viewing area in front of a display).

Image analyzer 220 may analyze the image (or images) to detect a user in a viewing area who is presenting an object in a manner that indicates an opt-in decision to interact with the system or that otherwise indicates that the user wishes to interact with the system. For example, the user may indicate an opt-in decision by standing within a certain distance of the image capture device (e.g., four to eight feet), and holding an object that the user believes may be recognizable by the system in view of the image capture device for recognition. In some implementations, the image analyzer 220 may use appropriate facial and/or object detection methodologies to identify users captured in the image, and to further determine whether any of the identified users is presenting an object in a manner that indicates a desire to interact with the system, e.g., based on the user's pose and/or positioning of the object.

Scenario selection engine 230 may execute on processor 212, and may be configured to select an interaction scenario for presentation based on the object that is being presented to the system by the user. For example, in response to the image analyzer 220 identifying an object that is being presented in an appropriate manner by a user, scenario selection engine 230 may query a repository 240 of known objects, e.g., based on a visual tag marked on the object, to determine if the presented object exists in the repository 240, and if so, may select the interaction scenario associated with the presented object for presentation to the user.

In some implementations, image analyzer 220 may extract one or more visual features of the object from the image, and may provide the extracted visual features to the scenario selection engine 230 for further processing. In such implementations, the scenario selection engine 230 may compare one or more of the extracted visual features of the presented object to one or more of the visual features associated with a set of known objects (e.g., stored in repository 240) to recognize the presented object as a particular one of the set of known objects, and may select the interaction scenario associated with the particular one of the set of known objects (as stored in repository 240).

Data table 242 may be stored in repository 240, and may be representative of information associated with any objects that are "known" to the system. As shown, data table 242 may include a unique object identifier, visual features of the object, an object descriptor, and an interaction scenario associated with the object. The visual features of an object may include a single value, e.g., representing a digital signature of a particular object, or may include a set of values, e.g., representing digital representations of various visual features of the object. In various implementations, the data in data table 242 may be entered, e.g., by a system administrator, either programmatically or via a training mode as described above.

Figure 3:
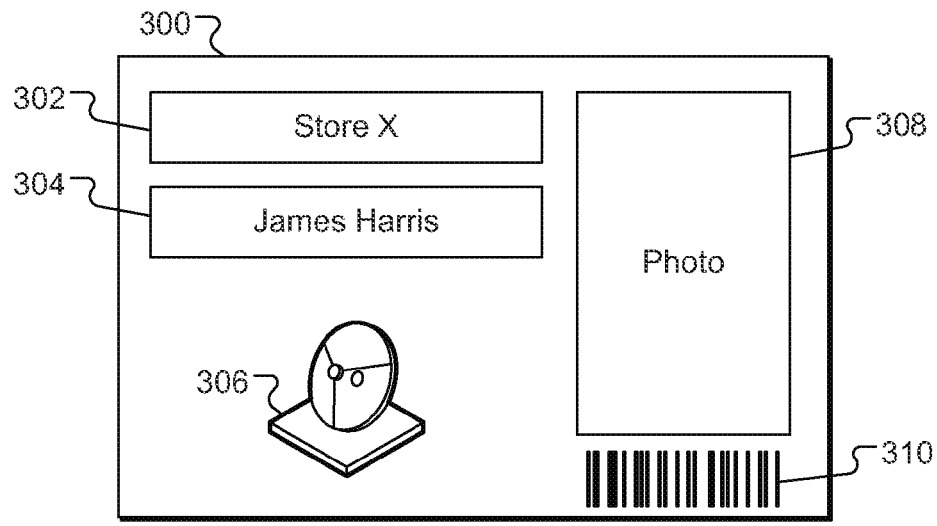
FIG. 3 is a diagram of an example object that may be used for initiating a sign-in process in accordance with implementations described herein.

FIG. 3 is a diagram of an example object 300 that may be used in accordance with implementations described herein. Object 300 represents a user identification card that may be recognized by a presentation system, such as the presentation system 10 described in FIG. 1, to trigger a user sign-in interaction scenario when the card is presented to the system. While described in the context of a customer signing in to a customer system using a customer loyalty card, similar techniques may be implemented in other contexts, such as an employee signing in to a work-based system using an employee badge or ID.

As shown, the user identification card may be of a generally rectangular shape and may include a number of visual elements, including a store name 302, a customer name 304, a store logo 306, a customer photo 308, and a barcode 310 representing the user's customer number. The visual elements may be arranged in the same manner for all customer loyalty cards issued by the particular store. The system 10 may be configured to recognize the object 300 based on portions or all of the visual indicators associated with the card (e.g., the rectangular shape in combination with the specific arrangement of the visual elements; or the rectangular shape in combination with the store logo 306 at a certain location within the rectangular shape; or any other appropriate indicators or combinations of indicators).

In some implementations, the system 10 may be trained to recognize each user's identification card separately, and each card may be used to trigger a sign-in interaction scenario for the particular user. In such implementations, certain visually distinctive portions of the cards (such as the customer name 304, customer photo 308, and/or barcode 310 representing the user's customer number) may be trained to be recognized by the system as an identification card belonging to the specific user.

In other implementations, the system 10 may be trained to recognize a generalized user identification card, which may be used to trigger a generalized sign-in interaction scenario. In such implementations, the visually distinctive portions of the cards may initially be ignored, while the standard features across all cards (e.g., the store name 302 and the store logo 306) may be trained to be recognized by the system as a generalized user identification card. The generalized sign-in interaction scenario may then be particularized for a particular user based on one or more specific object values. For example, the specific values associated with the distinct portions of the cards (e.g., the customer name 304, customer photo 308, and/or barcode 310 representing the user's customer number) may be provided as an input to the sign-in interaction that was triggered based on the recognition of the generalized user identification card. In this case, the system may store a single generalized object, which may be used to trigger the generalized interaction scenario, rather than storing each specific object as the triggering mechanism for the specific interaction scenarios.

Figure 4:
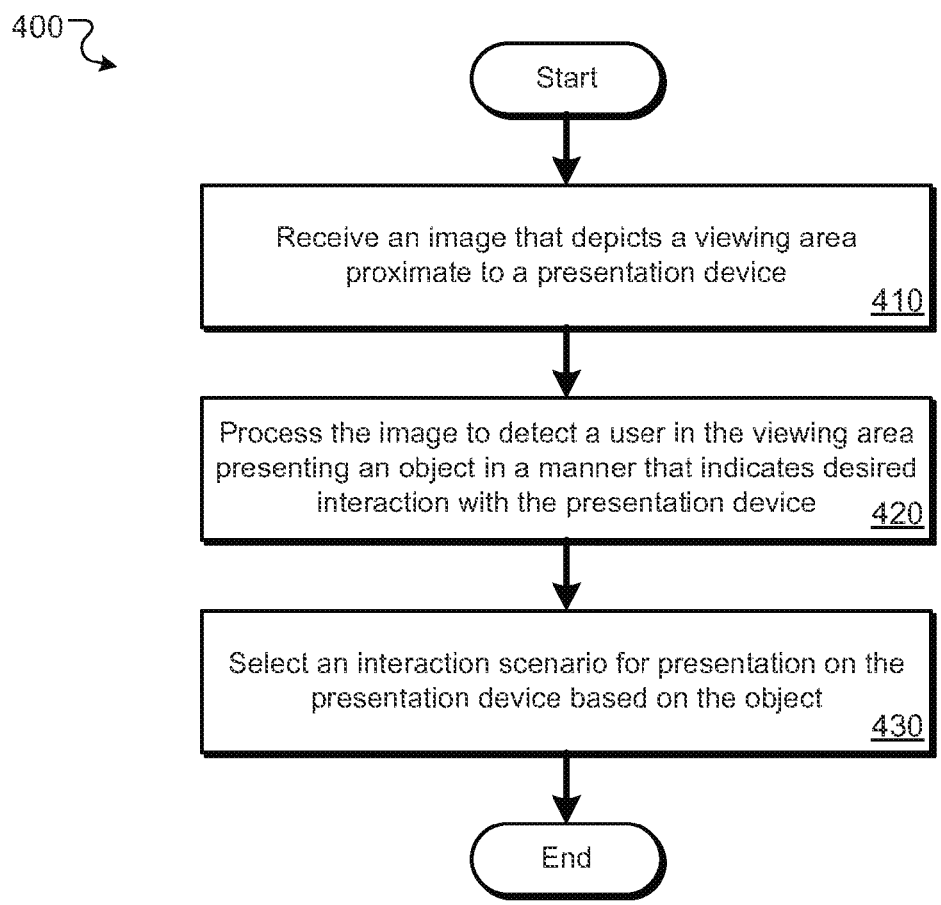
FIG. 4 is a flow diagram of an example process for selecting an interaction scenario in accordance with implementations described herein.

FIG. 4 is a flow diagram of an example process 400 for selecting an interaction scenario in accordance with implementations described herein. The process 400 may be performed, for example, by a computing system such as the content computer 18 illustrated in FIG. 1. For clarity of presentation, the description that follows uses the content computer 18 illustrated in FIG. 1 as the basis of an example for describing the process. However, it should be understood that another system, or combination of systems, may be used to perform the process or various portions of the process.

Process 400 begins at block 410 when a computing system, such as content computer 18, receives an image that depicts a viewing area proximate to a presentation device. The image may be received from an image capture device, such as a still camera, a video camera, a webcam, or other appropriate device positioned to capture one or more images of the viewing area.

At block 420, the content computer 18 may process the image to detect a user in the viewing area who is presenting an object in manner that indicates desired interaction with the presentation device. For example, content computer 18 may analyze the image using facial and/or object detection methodologies to identify users captured in the image, and to further determine whether any identified users are presenting an object in a manner that indicates a desire to interact with the system, e.g., based on the user's pose and/or positioning of the object.

At block 430, the content computer 18 may select an interaction scenario for presentation on the presentation device based on the object. For example, content computer 18 may recognize the presented object as a particular known object that is associated with a particular interaction scenario, and may select the particular interaction scenario for presentation on the presentation device. In some cases, such recognition of the presented object may be based on a visual tag that is applied to the presented object. In some implementations, recognizing the presented object as a particular known object may include extracting one or more visual features of the presented object from the image, and comparing the extracted visual features to corresponding visual features associated with a set of known objects to find a match. The content computer 18 may then cause the selected interaction scenario to be presented on the presentation device.

Although a few implementations have been described in detail above, other modifications are possible. For example, the logic flows depicted in the figures may not require the particular order shown, or sequential order, to achieve desirable results. In addition, other steps may be provided, or steps may be eliminated, from the described flows. Similarly, other components may be added to, or removed from, the described systems. Accordingly, other implementations are within the scope of the following claims.

What is claimed is:

1. A method comprising:
receiving, at a computer system and from an image capture device, an image that depicts a viewing area proximate to an electronic display device;
processing the image, using the computer system, to detect a user in the viewing area holding an object to present the object to the electronic display device in a manner that indicates an opt-in decision to initiate a desired interaction with the electronic display device, wherein the electronic display device is to present information according to a plurality of interaction scenarios; and
in response to the opt-in decision, selecting, using the computer system, an interaction scenario of the plurality of interaction scenarios for presentation of information on the electronic display device based on the object, wherein the object is a physical item that is held by the user.

2. The method of claim 1, wherein selecting the interaction scenario comprises comparing visual features of the object to visual features of a set of known objects, recognizing the object as a particular one of the set of known objects based on the comparison, and selecting the interaction scenario associated with the particular one of the set of known objects.

3. The method of claim 1, wherein the object comprises a user identifier, and wherein the interaction scenario comprises a user sign-in procedure for signing the user into a system.

4. The method of claim 3, wherein the interaction scenario further comprises presenting customer account information of the user on the electronic display device when the user is signed into the system.

5. The method of claim 4, wherein the validation of the user comprises facial recognition of the user based on the image.

6. The method of claim 1, wherein the object comprises a product, and wherein the interaction scenario comprises presenting product information associated with the product.

7. The method of claim 6, wherein the product information comprises at least one of a user review, another similar product, another complementary product, a coupon, and dynamic pricing of the product.

8. The method of claim 1, further comprising causing the interaction scenario to be presented on the electronic display device.

9. A presentation system comprising:
a display device;
an image capture device that captures an image of a viewing area proximate to the display device;
an image analyzer, executing on a processor, that analyzes the image to detect a user in the viewing area presenting an object in a manner that indicates an opt-in decision to initiate an interaction with the presentation system; and
a scenario selection engine, executing on a processor, that selects, in response to the opt-in decision, an interaction scenario for presentation on the display device based on the object,
wherein the object is a physical item that is held by the user.

10. The presentation system of claim 9, further comprising a known object database that contains a set of known objects, visual features associated with the known objects, and interaction scenarios associated with the known objects, wherein the image analyzer extracts visual features of the object from the image, and wherein the scenario selection engine compares the extracted visual features to the visual features associated with the known objects to recognize the object as a particular one of the set of known objects, and selects the interaction scenario associated with the particular one of the set of known objects.

11. The presentation system of claim 9, wherein the object comprises a user identifier, and wherein the interaction scenario comprises a user sign-in procedure for signing the user into a system.

12. The presentation system of claim 11, wherein the interaction scenario further comprises presenting customer account information of the user on the electronic display device when the user is signed into the system.

13. The presentation system of claim 9, wherein the object comprises a product, and wherein the interaction scenario comprises presenting product information associated with the product.

14. The presentation system of claim 13, wherein the product information comprises at least one of a user review, another similar product, another complementary product, a coupon, and dynamic pricing of the product.

15. A non-transitory computer-readable storage medium storing instructions that, when executed by one or more processors, cause the one or more processors to:
receive an image that depicts a viewing area proximate to a retail store presentation device comprising an electronic display;
process the image to detect a user in the viewing area holding an object to present the object to the retail store presentation device in a manner that indicates an opt-in decision to initiate an interaction with the retail store presentation device, wherein the object includes a unique identifier for the user, wherein the retail store presentation device is to present information according to a plurality of interaction scenarios; and
select, in response to the opt-in decision, an interaction scenario of the plurality of interaction scenarios for presentation on the retail store presentation device based on the unique identifier included in the object, wherein the interaction scenario comprises displaying customer account information of the user on the retail store presentation display device.

16. The non-transitory computer-readable storage medium of claim 15, wherein selecting the interaction scenario comprises comparing visual features of the object to visual features of a set of known objects, recognizing the object as a particular one of the set of known objects based on the comparison, and selecting the interaction scenario associated with the particular one of the set of known objects.

17. The non-transitory computer-readable storage medium of claim 15, wherein the unique identifier is a customer loyalty identifier for a retail store.

18. The non-transitory computer-readable storage medium of claim 17, wherein the interaction scenario comprises displaying customer loyalty information for the user.

19. The non-transitory computer-readable storage medium of claim 18, wherein the validation of the user comprises facial recognition of the user based on the image.

20. The non-transitory computer-readable storage medium of claim 15, wherein the interaction scenario comprises displaying a discount offer specific to the user.

* * * * *